(12) United States Patent
Alasaarela et al.

(10) Patent No.: US 9,411,848 B2
(45) Date of Patent: Aug. 9, 2016

(54) COMPARATOR

(71) Applicant: ZEF Solutions Oy, Oulu (FI)

(72) Inventors: Jaakko Alasaarela, Oulu (FI); Juha Koskela, Oulu (FI)

(73) Assignee: ZEF Solutions Oy, Oulu (FI)

( * ) Notice: Subject to any disclaimer, the term of this patent is extended or adjusted under 35 U.S.C. 154(b) by 924 days.

(21) Appl. No.: 13/689,109

(22) Filed: Nov. 29, 2012

(65) Prior Publication Data

US 2013/0144897 A1 Jun. 6, 2013

(30) Foreign Application Priority Data

Dec. 1, 2011 (FI) .................................... 20116210

(51) Int. Cl.
*G06K 9/68* (2006.01)
*G06F 17/30* (2006.01)
*G06Q 30/02* (2012.01)
*G06Q 30/06* (2012.01)

(52) U.S. Cl.
CPC .......... *G06F 17/30386* (2013.01); *G06Q 30/02* (2013.01); *G06Q 30/0201* (2013.01); *G06Q 30/0269* (2013.01); *G06Q 30/0277* (2013.01); *G06Q 30/0641* (2013.01); *G06Q 30/0643* (2013.01)

(58) Field of Classification Search
CPC .............. G06Q 30/0643; G06Q 30/02; G06Q 30/0201; G06Q 30/0269; G06Q 30/0277; G06Q 30/0641
See application file for complete search history.

(56) References Cited

U.S. PATENT DOCUMENTS

| 5,041,972 | A | * | 8/1991 | Frost | ....................... G06F 17/18 705/7.32 |
|---|---|---|---|---|---|
| 7,693,743 | B2 | | 4/2010 | Alasaarela | |
| 8,046,259 | B1 | * | 10/2011 | Siegel | .................... G06Q 10/10 705/14.73 |
| 9,189,798 | B2 | * | 11/2015 | Title | ....................... G06Q 30/02 |
| 2003/0182370 | A1 | * | 9/2003 | Alasaarela | ....... G06Q 10/06398 709/204 |
| 2004/0133461 | A1 | * | 7/2004 | Hayashi | ............. G06Q 30/0203 705/7.32 |
| 2006/0059130 | A1 | | 3/2006 | Weiss et al. | |

(Continued)

OTHER PUBLICATIONS

Finnish Search Report for priority application FI 20116210 dated Oct. 8, 2012.

*Primary Examiner* — Stephen R Koziol
*Assistant Examiner* — Jonathan S Lee
(74) *Attorney, Agent, or Firm* — Andrus Intellectual Property Law, LLP

(57) ABSTRACT

A method, a data network arrangement and a computer program product, by means of which a comparator can be implemented in a data network, in which comparator a possibility of online chat can also be utilized. The comparator user stores his evaluation of the properties included in the targets being evaluated in a database in the server in the data network by using a graphic one- or two-dimensional evaluation frame. In the comparator the comparator user's evaluations are compared to property values set for each target being evaluated. During the comparison the comparator analyses the data entered into the comparator by the comparator user against predetermined online chat threshold values. If even one online chat threshold value is exceeded, it is in the comparator according to the invention possible to offer the comparator user an online chat with the service provider's customer servant in order to support the decision-making.

18 Claims, 5 Drawing Sheets

(56) References Cited

U.S. PATENT DOCUMENTS

| | | | |
|---|---|---|---|
| 2006/0184617 A1* | 8/2006 | Nicholas | G06Q 30/02 709/203 |
| 2008/0010598 A1 | 1/2008 | Smilowitz et al. | |
| 2010/0325107 A1* | 12/2010 | Kenton | G06Q 30/00 707/723 |
| 2011/0004533 A1* | 1/2011 | Soto | G06Q 30/00 705/27.1 |
| 2011/0137776 A1* | 6/2011 | Goad | G06Q 20/102 705/34 |
| 2012/0130934 A1* | 5/2012 | Brillhart | G06Q 30/0203 706/46 |
| 2014/0172625 A1* | 6/2014 | Reisman | G06Q 30/02 705/26.7 |
| 2015/0089399 A1* | 3/2015 | Megill | G06Q 30/0203 715/753 |

* cited by examiner

COMPARATOR

FIELD

The invention relates to a comparator, a comparison method utilised therein and a data network arrangement for implementing the comparison of properties of a comparison target utilising a user's data processing device and a graphic comparison tool in the comparator and online chat. The invention also relates to a computer program to be utilised in the comparator.

BACKGROUND

The mutual comparison of two or more comparison targets can be implemented by utilising a data network. The comparison target may for example be a product, a service, a travel destination, a person etc. The purpose of the comparison is to produce a final result, on the basis of which a target can be presented to a person performing the comparison from several possible comparison targets, which target best corresponds to the needs and desires of the person performing the comparison with regards to the properties used in the comparison, which describe the comparison target. Said comparison system is generally called a comparator.

FIG. 1a shows a one-dimensional evaluation line 1 and an opinion/evaluation 2 presented by a user about an evaluation statement presented in connection with some property. In the example in FIG. 1a the left end of the line illustrates a situation, where the comparator user agrees with the presented statement regarding an examined property. The right end of FIG. 1a illustrates a situation, where the comparator user completely disagrees with the presented statement. The evaluation given by the comparator user regarding the presented statement can be compared to several different comparison targets. By proceeding thus it is possible to calculate a congruency between the evaluation given by the comparator user and each comparison target, which congruency can be called an accuracy percentage.

In addition to a one-dimensional evaluation line, the comparator can also utilise a two-dimensional fourfold. A single question fourfold of the comparator consists of two properties to be examined, which are set perpendicularly against each other in the displayed fourfold. The properties to be compared with the aid of the question fourfold are in some way related to each other. Each property is in the question fourfold described for example with numerical values 0-100%. Any values can naturally be selected as the numerical values of the end points, for example −10 and +10. Alternatively the properties to be compared can be described with word pairs, e.g. disagree ↔ agree, bad ↔ good or unimportant ↔ important.

FIG. 1b shows a principled model of a question fourfold 3 to be utilised in the comparator. The user of the question fourfold steplessly moves a response cursor 4 to a desired spot in the question fourfold 3. This stepless aiming possibility has been illustrated with four arrows pointing out from the cursor 4. When the response cursor 4 is according to the user in a spot, which corresponds to his opinion or evaluation with regards to the two properties shown in the fourfold, the user locks the response cursor 4 with a function related to the data processing device he uses.

In the examples in FIG. 1b the numerical value 0% of the horizontal axis of the fourfolds is situated in the left edge of the question fourfold and the numerical value 100% in the right edge of the question fourfold. Correspondingly the numerical value 0% of the vertical axis of the question fourfold is situated in the lower edge of the question fourfold and the numerical value 100% in the top edge of the question fourfold. What corresponds to a numerical value of 0% or 100% for each property is based on the definition made by the creator of the comparison procedure.

A person using the two-dimensional comparator sees two properties of the comparison target, one on the horizontal axis and one on the vertical axis. Generally the ends of the axes of the question fourfold describe opposite pairs of the same property. By using the two opposite pairs included in the question fourfold the comparator user can present his own evaluation of both examined properties by placing one evaluation point in a selected spot in the fourfold.

An example of a two-dimensional comparator is presented in U.S. Pat. No. 7,693,743. The patent presents a data collection and presentation method functioning in a data network, where a stepless two-dimensional data collection and presentation manner is utilised for collecting opinions and presenting the results of the inquiry. In the method according to the patent the operation is based on collecting evaluation data with the aid of a data network from persons selected by the person administrating the inquiry, the so-called inquiry creator, in two or more dimensions. The evaluation results of each evaluator are normalised per respondent, so that the average of the evaluation points of the evaluator entered into the fourfold is set in the origin and the deviation (standard deviation or some other value describing deviation) in a set standard value for each person performing the evaluation. With the described method the given responses can be scaled so that the evaluator's order of importance of different properties of the evaluation target are detected from the inquiry results, even if the responses given by some evaluator of the properties being evaluated were to be concentrated close together. Additionally the order of importance given to the properties by an individual evaluator can be scaled with the responses given by other participants in the inquiry. The scaled result can also be called a normalised result.

In the above-described examples the congruency of an evaluation given by a comparator user and one property of the target being evaluated can be expressed mathematically with the following expression:

$$A = \left[1 - \frac{|X_K - X_E|}{N}\right] * 100, \qquad (1)$$

in which

N is an integer number, with which the axis of the question fourfold 3 (or the evaluation line 1) is divided into equally large parts (N is advantageously a number between 100 and 1000)

$X_K$ is the value of the user's response point between 0 and N $X_E$ is the value of the response point of the target being evaluated between 0 and N and A is the congruency of an evluation given by the comparator user and the property of the target being evaluated expressed as an accuracy percentage for one axis of the question fourfold or evaluation line.

The total percentage S of the congruency of all evaluations given by the comparator user and all the properties of the target being evaluated is obtained with the equation:

$$S = \sum_{j=1}^{n} \frac{A_j}{n}, \qquad (2)$$

in which
S is the congruency percentage of all the responses
$A_j$ is the congruency of axis jas an accuracy percentage and
n is the total number of axes included in the utilised four-folds and/or evaluation lines.

The comparator calculates the congruency of the evaluations of the comparator user and the properties of a certain comparison target using the equations (1) and (2). If necessary, the comparator calculates a corresponding congruency percentage illustrating the congruency for all comparison targets selected by the user.

A message-based online chat (Chat or LiveChat) implemented in a data network can also be utilised for comparing, marketing and selling articles and services. In the online chat a customer servant of the service provider and a possible buying customer engage in mutual text-based communication with the aid of their own data processing devices. The customer servant can with his own text-based messages guide the customer on the webpage by answering the questions posed by the customer or by posing his own specifying questions.

The online chat can be activated in many ways. There can for example be a button on the service provider's webpage, with which a customer on the webpage can invite a customer servant of the service provider to an online chat. Alternatively the customer servant can on his own offer online chat to a customer on the webpage. The decision about offering an online chat can be based on actions made by the customer on the service provider's webpage.

SUMMARY

An object of the invention is to present a data network arrangement which can be utilised in a data network, which combines a comparator and online chat, where individual responses or a complex of responses given by the comparator user are used in the comparator for indicating a need for offering also an online chat service to the comparator user in order to solve some problem which the comparator customer ponders.

The objects of the invention are attained with an improved comparator implemented in an electric data network, which comparator comprises computer program means for receiving and storing evaluations given by the comparator user with his data processing device. The comparator also comprises computer program means for storing different properties of the targets to be evaluated in the comparator. The comparator advantageously also comprises computer program means, by using which the comparator user can be offered also an online chat possibility with a customer servant of the service provider, in order to support his decision-making. The comparator indicates to the service provider's customer servant a need for offering online chat based on an analysis of one or more evaluation results given by the comparator user.

An advantage of the invention is that it is possible with the comparator to indicate a need of the comparator user for receiving additional information in order to make decision-making easier to the service provider's customer servant.

An advantage of the invention is additionally that the decision of the comparator to indicate a need for online chat can from case to case be based on one or more decision-making arguments.

An advantage of the invention is additionally that the comparator can offer the comparator user also such information making decision-making easier, which is not included in the evaluation targets used in the comparator.

The comparison method according to the invention utilised in the comparator is characterised in that the method comprises
  opening the comparator in the server by a command sent by a comparator user's data processing device;
  selecting at least one comparison target from the comparison targets of the comparator, which comparison targets comprise at least one evaluation property, by a command given by the comparator user's data processing device;
  giving an evaluation regarding at least one property of the comparison target being evaluated with the comparator user's data processing device by using the graphic evaluation frame;
  determining in the comparator an accuracy percentage illustrating the congruency between the evaluation given by the comparator user and one property of the selected comparison target;
  saving the determined accuracy percentage in the comparator;
  indicating in the comparator that at least one an online chat threshold value set for a property of the comparison target has been exceeded;
  indicating on a data processing device of a customer servant of a service provider a need of an online chat; and after the online chat;
  displaying on the comparator user's data processing device a total accuracy percentage obtainable from the comparator of all properties of at least one comparison target.

The data network arrangement according to the invention, with which the comparator has been implemented, is characterised in that the data network arrangement comprises:
  at least one comparator user's data processing device for the comparator user to give an evaluation of at least one property of a comparison target being compared with a graphic evaluation frame;
  a data transfer network;
  a server, which includes the comparator comprising:
    means for providing the graphic evaluation frame of the comparator as a www-page on comparator users' data processing device;
    a database for saving evaluations of the comparison target given with the users' data processing device using the graphic evaluation frame;
    means for calculating both a property-specific accuracy percentage and a total accuracy percentage of the comparison target;
    means for indicating that at least one online chat threshold value set for a property of the comparison target has been exceeded in the comparator;
    means for engaging in online chat in the comparator, if the comparator has indicated that the online chat threshold value has been exceeded;
    means for displaying the comparison result of the comparator graphically on the screen of the comparator user's data processing device in an order determined by the total accuracy percentage.

The computer-readable non-transitory data storage medium including a computer program for a property comparator, is characterised in that it comprises:
  computer readable code for opening the comparator in the server by a command sent by a comparator user's data processing device;

computer readable code for selecting at least one comparison target from the comparison targets of the comparator, which comparison targets comprise at least one evaluation property, by a command given by the comparator user's data processing device;

computer readable code for giving an evaluation regarding at least one property of the comparison target being evaluated with the comparator user's data processing device by using the graphic evaluation frame;

computer readable code for determining in the comparator an accuracy percentage illustrating the congruency between the evaluation given by the comparator user and one property of the selected comparison target;

computer readable code for saving the determined accuracy percentage in the comparator;

computer readable code for indicating in the comparator that at least one an online chat threshold value set for a property of the comparison target has been exceeded;

computer readable code for indicating on a data processing device of a customer servant of a service provider a need of an online chat; and after the online chat;

computer readable code for displaying on the comparator user's data processing device a total accuracy percentage obtainable from the comparator of all properties of at least one comparison target.

Some advantageous embodiments of the invention are presented in the dependent claims.

The basic idea of the invention is the following: The comparator user performs a comparison of evaluation targets in a comparator implemented by programming in a server connected to a data network. The comparator comprises computer program means according to the invention, which comprise evaluation questions to be defined based on the evaluation target. The evaluation questions include properties or features of the target to be evaluated, which properties or features are essential for the made comparison. The inquiry questions are presented to a comparator user advantageously on a graphic evaluation frame, which can be created on the screen of the comparator user's data processing device. The comparator user can give his own evaluation of the properties of the target being evaluated utilising either a two-dimensional fourfold or a one-dimensional evaluation line.

The computer program means also comprise a database for each comparator, the information comprised in which can be utilised for indicating to the service provider's customer servant such situations during the use of the comparator, where additional information could be offered to the comparator user by utilising online chat. In this way the evaluation points which are central and important for the decision-making of the comparator user can be gone through also in online chat and the comparator user can thus be offered also such additional information for the basis of his decision-making, which is not included in the evaluation questions included in the comparator.

The functions of the comparator can be implemented also as a so-called cloud service, which is also called cloud computing. In the cloud service the computer technical services are spread out and outsourced to service providers operating in the data network. The cloud computing occurs within a "cloud", such as for example the internet. The comparator user is not aware of using a spread-out service, because the use experience corresponds to the feeling of a locally produced comparator. The user only sees and experiences the comparator interface, just like with a direct server connection.

BRIEF DESCRIPTION OF THE DRAWINGS

In the following, the invention will be described in detail. In the description, reference is made to the enclosed drawings, in which.

DETAILED DESCRIPTION OF THE DRAWINGS

The embodiments in the following description are given as examples only and someone skilled in the art can carry out the basic idea of the invention also in some other way than what is described in the description. Though the description may refer to a certain embodiment or embodiments in several places, this does not mean that the reference would be directed towards only one described embodiment or that the described characteristic would be usable only in one described embodiment. The individual characteristics of two or more embodiments may be combined and new embodiments of the invention may thus be provided.

Figure 1A:
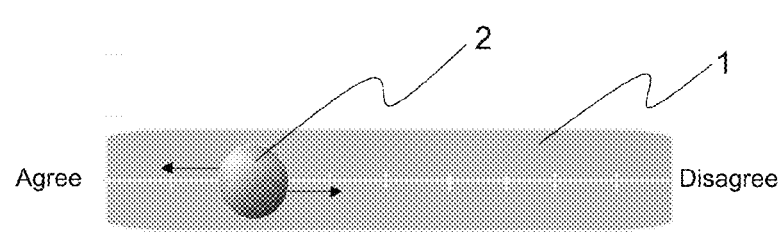
FIG. 1a shows as an example a one-dimensional evaluation line according to prior art.
Figure 1B:
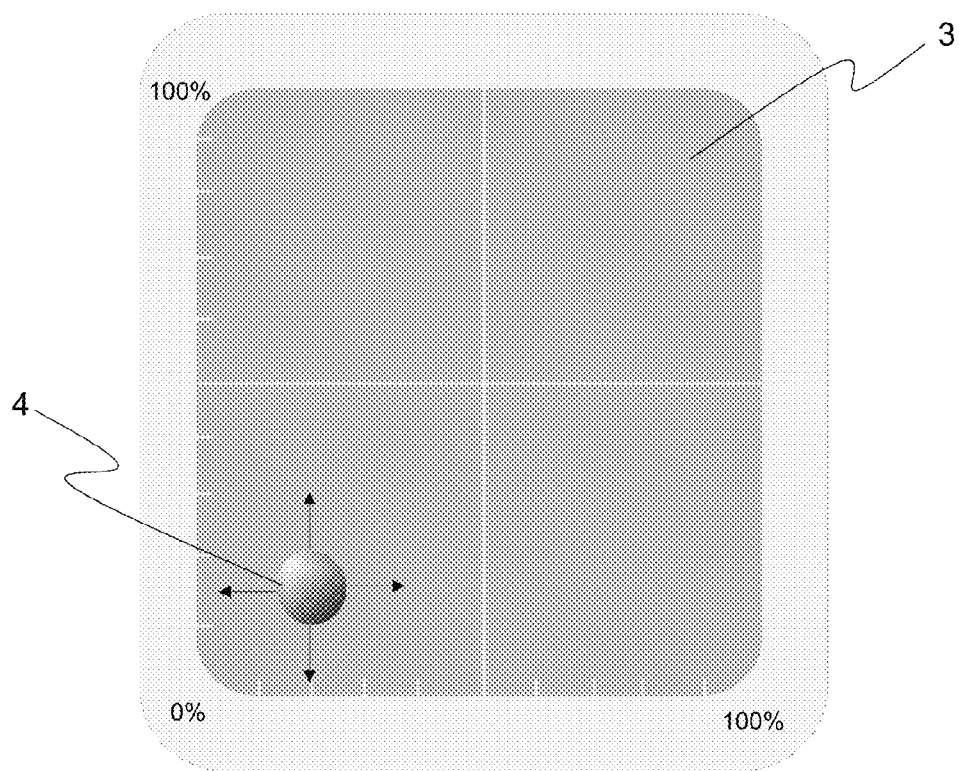
FIG. 1b shows as an example a question fourfold according to prior art.

FIGS. 1a and 1b have been described in connection with the description of the prior art.

Figure 2A:
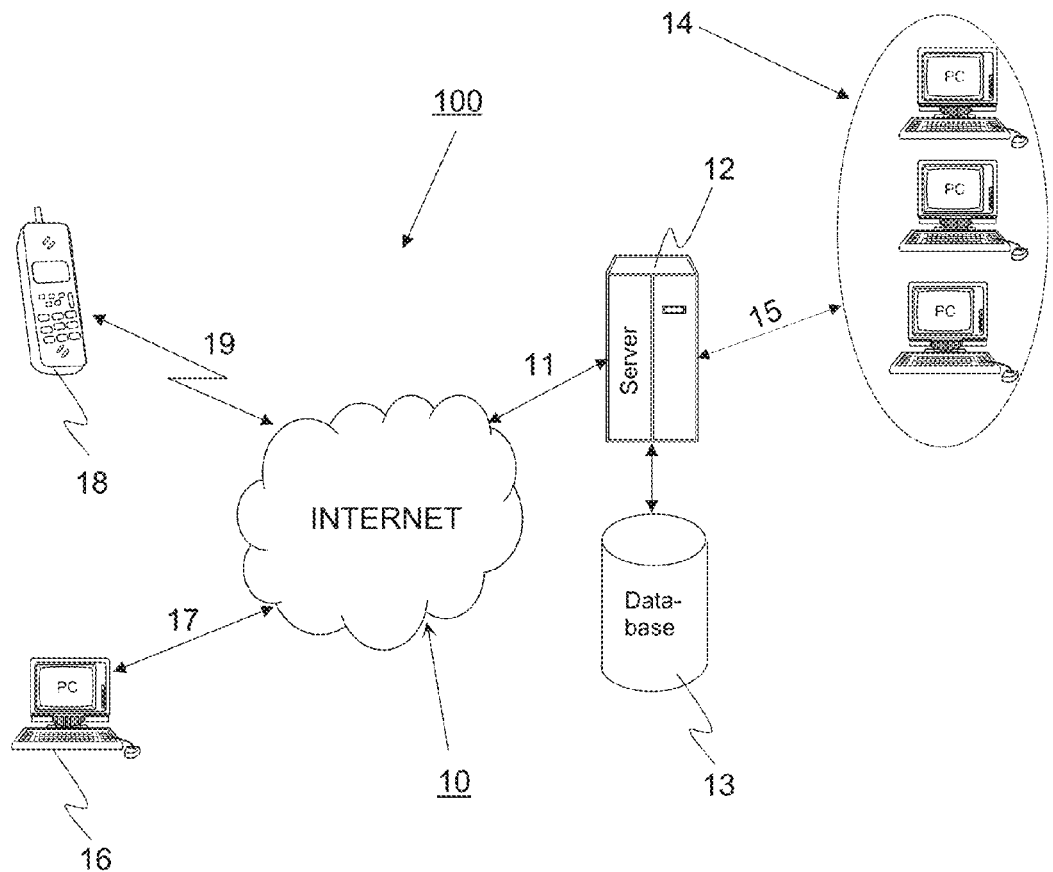
FIG. 2a shows as an example a comparator arrangement according to the invention.

FIG. 2a shows as an example a combined comparator and online chat arrangement 100 according to the invention. Comparator users connect with their own data processing device 16, 18 via the Internet 10 to a server 12, wherein a computer software has been installed, which implements the functions of the comparator according to the invention. Each comparator user can open from the server 12 the comparator according to the invention from a www-page found on the server.

FIG. 2a shows two exemplary data processing devices 16 and 18, which an individual comparator user can utilise when making the comparison. Reference 16 shows a conventional computer, which is connected to the Internet 10 via a fixed data communication connection 17. Reference 18 shows as an example a data processing device connecting to the Internet via a wireless data transfer connection 19. The wirelessly functioning data processing device 18 can for example be a cellular network terminal such as a mobile phone, a palmtop computer or a portable computer equipped with a WLAN feature. When it is desirable to use the comparator, the www-page of the comparator available on the server 12 is opened with the data processing device 16 or 18. The comparator is opened from the www-page. A response is given to the questions of the comparator by using a graphic user interface created by the comparator which opens on the screen of the data processing device 16 or 18, which user interface is advantageously a question fourfold or a comparison line. The comparator can simultaneously utilise both comparison lines and question fourfolds. Each individual question fourfold or comparison line opens up in the comparator advantageously as a new www-page.

The server 12, wherein the computer program implementing the comparator and online chat arrangement according to the invention is installed, is advantageously connected with a fixed data transfer connection 11 to the Internet 10.

Reference 14 shows data processing devices used by the customer service personnel of one service provider. When the comparator according to the invention produces an indication that some threshold value predefined for a certain comparison target has been exceeded, then one of the service provider's customer servants can with his own data processing device 14 send a message to the data processing device 16 or 18 of the comparator user, in which message a possibility is offered to create an online chat connection.

If the comparator user accepts the online chat offer presented by the service provider, an online chat is started between the comparator user and the service provider's customer servant.

Figure 2B:
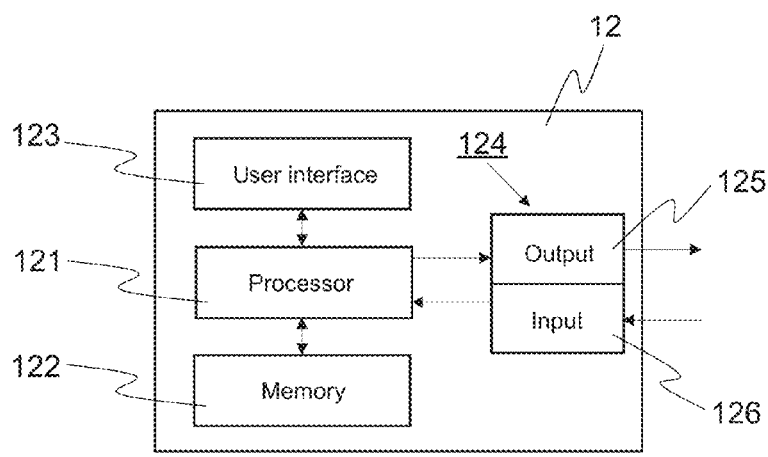
FIG. 2b shows as an example a server utilised in the implementation of a comparator according to the invention.

FIG. 2b shows the operational main parts of the server 12 utilised in the implementation of the comparator according to the invention. The server 12 comprises a processor or processor means 121, which advantageously comprise an arithmetic logic unit, a number of different registers and control circuits. A data storing arrangement 122, such as memory unit or memory means, whereon computer-readable information, programs or user data can be stored, has been connected to the processor means 121. The memory means 122 typically contain memory units, which allow both reading and writing functions (Random Access Memory, RAM), and memory units containing non-volatile memory, from which data can only be read (Read Only Memory, ROM).

The server 12 also comprises an interface element 124, which comprises an input or input means 126 for receiving data from the comparator users' data processing devices 16, 18 via a data communications network 10, from the customer servants' data processing devices 14 or from the separate database device 13. The data received with the input means 126 is advantageously transferred to be processed by the processor means 121 of the server 12.

The interface element 124 of the server 12 also comprises an output or output means 125, with which data is transferred from the processor means of the server 12 either to a data transfer network 10 and from there to the comparator user's data processing device 16 and 18, to the database device 13 or to data processing devices 14 of persons doing customer service.

The server 12 advantageously also comprises a user interface 123, which comprises means for receiving data and/or control commands from the user of the server 12. The user interface 123 can for example comprise a keyboard, a touch screen, a microphone and a speaker.

The processor means 121, the memory means 122, the interface element 124 and the user interface 123 are electrically connected together to systematically execute received and/or stored data or information in accordance with predetermined and substantially pre-programmed operational sequences. Such operational sequences also include the operational sequences described in connection to FIGS. 3 and 4, which implement the functions of the comparator/online chat arrangement according to the invention.

The detailed implementation of the logical units of the server in FIG. 2b is prior art to someone skilled in the art.

It is obvious to someone skilled in the art that the functions of the comparator can advantageously also be implemented as a so-called cloud service or cloud computing. In this embodiment the comparator user is not aware of using a spread-out service, because the use experience corresponds to the view of a locally produced comparator. The comparator user only sees the comparator interface, just as in the embodiment where the comparator is implemented in a server administered by the service provider.

The number of graphic evaluation frames, such as question fourfolds and/or evaluation lines, included in a certain comparison made with a comparator depends on the subject matter of the comparison performed with the comparator and on how easy the comparison has been made for the user. The number of properties being evaluated and the preciseness of the results striven for in the comparison are thus taken into account. The comparison target may for example be a product comparison, a service comparison, an election machine, a risk evaluation, a quality evaluation, a workplace wellbeing study or a job aptitude test. The larger the number of question fourfolds or evaluation lines with their questions that is utilised in the comparison, the more precise the result of the inquiry made with the comparator will turn out.

When the comparator user has given his own evaluations of all the properties of the evaluation target, an accuracy percentage is then calculated in the comparator for each property of each comparison target. The accuracy percentage of the user's evaluations and one property of a certain comparison target is calculated in the comparator according to the invention advantageously with the equation (1).

The total accuracy percentage of the evaluations of the actual comparator user for one target being compared is obtained with the equation (2).

Figure 3:
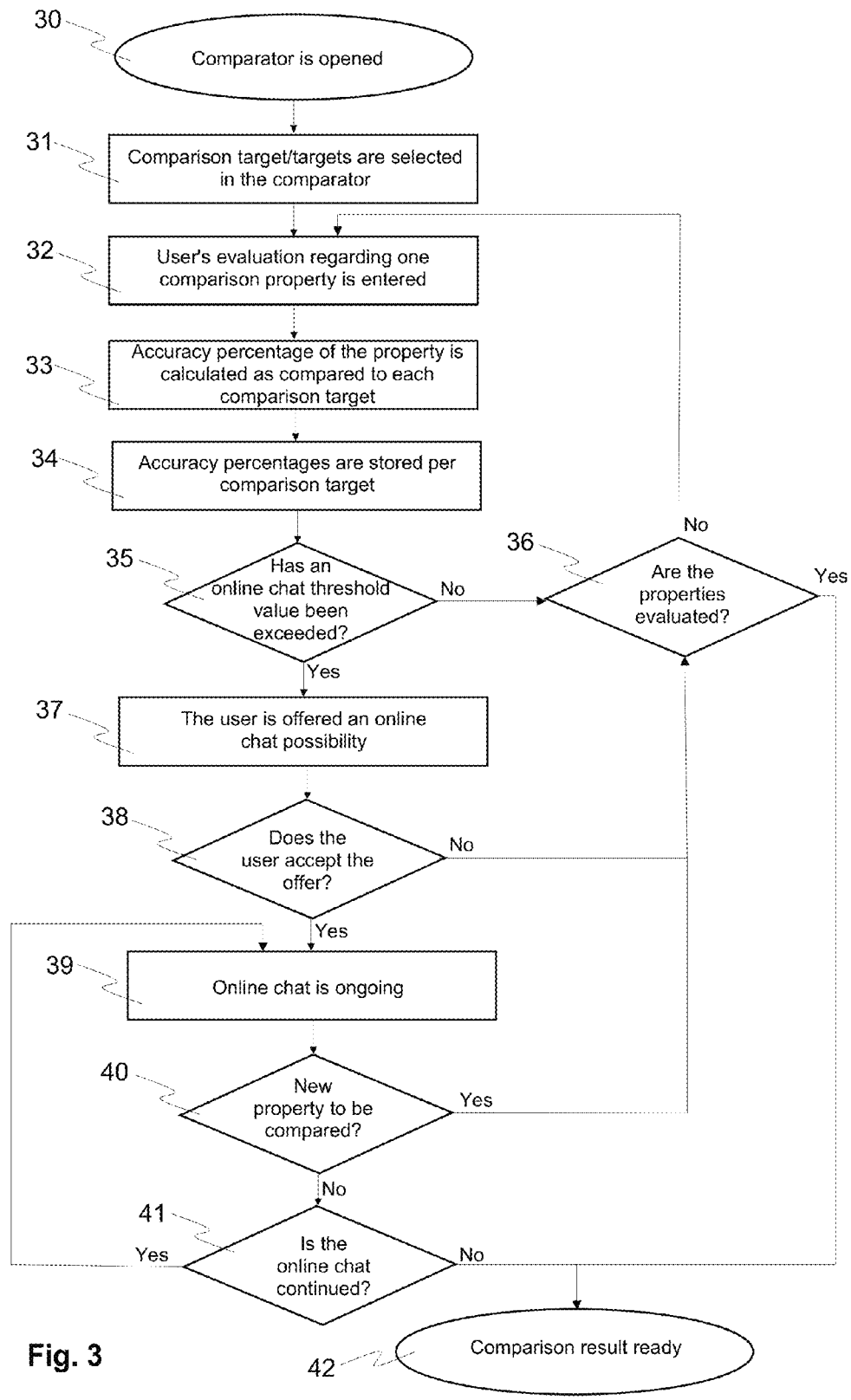
FIG. 3 shows as an exemplary flow chart the operational main steps of the comparator according to the invention.

FIG. 3 shows as an exemplary flowchart the main functions of a comparator according to an embodiment of the invention. In the comparator according to this embodiment information obtainable from an analysis of the comparator user's actions registered during the use of the evaluation tool are utilised for indicating the need for online chat.

In step 30 the comparator user opens the comparator according to the invention in the server 12. Thus the first www-page of the comparator is displayed on the screen of the comparator user's data processing device.

In step 31 the comparator user selects the comparison target/targets to be used in the comparator, against which the evaluations given by the comparator user by means of his data processing device are compared. An individual comparison target can comprise several separate properties to be compared. In the comparator the value of an individual property to be compared, such as for example price, safety, familiarity etc., varies in the comparison targets selected in the comparator.

In step 32 the comparator user enters his own evaluation in the comparator with his data processing device regarding one property being evaluated. The user can enter his evaluation into the comparator advantageously either using a fourfold or an evaluation line. Both embodiments utilise a stepless graphic response arrangement, whereby the user sets his evaluation result in the graphic evaluation frame on his data processing device in a freely selected spot.

In step 33 the congruency of the evaluation given by the comparator user and at least one property of the comparison target, the accuracy percentage A, is calculated using the equation (1). If the comparator user wants to compare the evaluations he has given of a certain property against several different comparison targets, then its own accuracy percentage A illustrating this property is calculated for each target being compared.

In step 34 the comparator stores the comparison result of the same property of all the targets being compared in the database 13. Advantageously several properties of the target/targets are evaluated in the comparator in sequence. This is possible in the manner described below, where the comparator returns to step 32 via the steps 35, 36, 38 or 40 described below.

In step 35 the comparator analyses the comparator's operations and evaluation results during the time when the user has given his evaluations of the posed question or statement. The result of the analysis is advantageously an indication regarding whether the comparator user is offered an online chat possibility as a support for his decision-making.

If the comparator does not generate said indication, the comparison process advances to step 36.

In step 36 it is evaluated whether evaluation of the properties of the target is continued in the comparator or not. If it is in step 36 found that all the questions of said comparator have been gone through or that the comparator user wants to shut down the comparator, then the comparator advances to step 42. In step 42 a total accuracy percentage S is first calculated with the equation (2) for each target being evaluated and in the second stage the final result of the comparison is displayed on the screen of the comparison user's data processing device. Advantageously the targets displayed in step 42 are placed in order determined by the total accuracy percentage S.

If it is in step 36 found that there are questions in the comparator which have not been gone through and the comparator user does not want to stop using the comparator, then the comparator returns to step 32, where the comparator user can give his evaluation of the next property to be compared included in the comparator.

If in step 35 the comparator generates an indication that the comparator user could benefit from online chat, the service provider's customer servants receive information about this. Advantageously the customer servant who received the indication makes the final decision about offering online chat to the comparator user.

If it is decided to offer online chat, an online chat offer is presented to the comparator user. The made offer is sent as a text-based message, which is printed onto the screen of the comparator user's data processing device, in which message an online chat possibility is offered.

In step 38 the comparator user either accepts or rejects the presented online chat offer by giving a response on his own data processing device.

If the comparator user does not accept the presented online chat offer, the comparator returns to step 36 and the server 12 shuts the customer servant out of the comparator. Thereafter step 36 can proceed in the manners described above in connection with the description of step 36.

If the comparator user accepts with his data processing device the presented online chat offer, then in step 39 the comparator user and the service provider's customer servant exchange text-based messages with each other with their data processing devices as controlled by the server 12.

The online chat moves to step 40 with a command given by the comparator user, in which step a decision is made regarding whether the comparator user wants to give his evaluation about some other property, which has not yet been evaluated.

If in step 40 the comparator user with his data processing device gives a command that a new property to be evaluated is to be included in the performed comparison, then in this case the comparator returns via the above-described steps 36-38 finally back to the online chat step 39.

Successive evaluation and online chat steps are continued for so long that the comparator user no longer wants new properties to be evaluated. Thus the comparator user gives with his data processing device a command that the comparator proceeds to step 41, where a decision is made regarding whether the online chat is ended or not.

If the comparator user decides to end the online chat with a command given with his data processing device, then the comparator advances to step 42, where the final result of the comparison can be displayed on the screen of the comparator user's data processing device. In connection with the final result the messages exchanged between the parties during the online chat can advantageously also be displayed.

If the comparator user decides in step 41 to continue the online chat, then with a command given by the comparator user with his data processing device the comparator returns to step 39, where exchange of messages between the parties is still possible. With this arrangement the comparator user retains a possibility to continue the evaluation of properties of the target/targets either solely as an online chat or to through step 40 take a yet unevaluated property into the evaluation.

Figure 4:
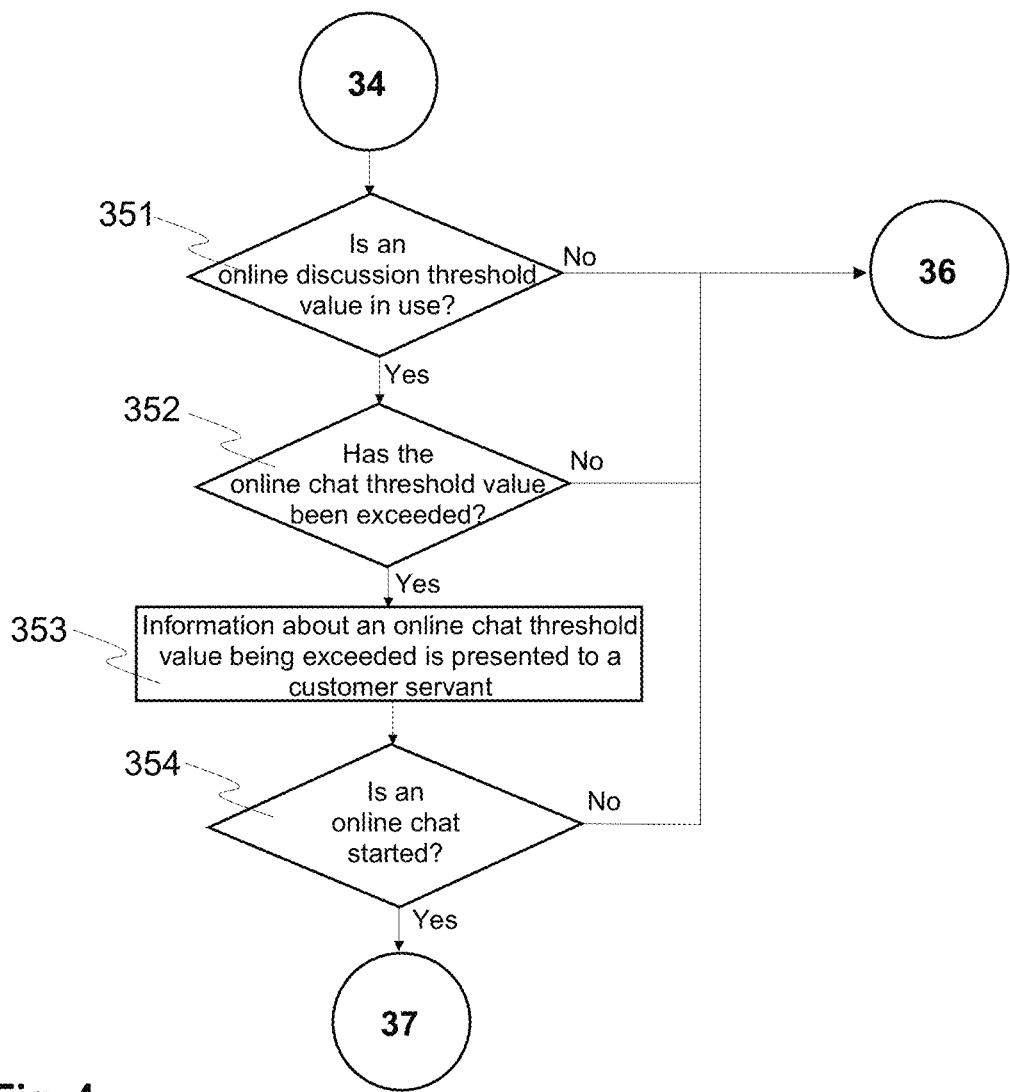
FIG. 4 shows as an exemplary flow chart the main steps of the threshold value comparison made in the comparator according to the invention.

FIG. 4 shows as an exemplary flow chart the sub-functions included in step 35 in FIG. 3.

After step 34 it is in the comparator in step 351 examined if a threshold value has been preset for said property being evaluated on its own or together with some other property being evaluated, as a result of the exceeding of which value the comparator is arranged to generate an indication for a need for online chat. If no threshold value has been set for this property being compared, the comparator continues to step 36.

If it is found that a threshold value has been determined for this property being compared, then the comparator advances to step 352. In step 352 the comparator makes a decision regarding whether the preset threshold value has been exceeded or not based on the evaluation given by the comparator user.

If the evaluation given by the comparator user exceeds the set threshold value, then in this case the comparator is configured to indicate the exceeding of the threshold value to the data processing device of the service provider's customer servant in step 353.

In step 354 the service provider's customer servant makes a decision about an online chat offer. If the customer servant does not make a decision or makes a negative decision with his data processing device, the comparator continues to step 36.

If the customer servant decides in step 354 to offer a possibility for online chat to the comparator user, he sends a message containing the online chat offer with his data processing device to the data processing device of the comparator user via the server 12. Thereafter the comparator advances to step 37, which proceeds in the manner described in connection with FIG. 3.

The process steps described in FIGS. 3 and 4 to be implemented in the comparator and online chat device can be implemented with computer program commands, which are executed in a suitable general-purpose or special-purpose processor. The computer program commands can be stored in a computer-readable media, such as a data disk or a memory, from where the processor of the data processing device can retrieve said computer program commands and execute them. The references to computer-readable media can for example also contain special components, such as programmable USB Flash memories, logic arrays (FPLA), application-specific integrated circuits (ASIC) and signal processors (DSP).

Some exemplary threshold values are presented in the following, which may be utilised in the comparator according to the invention.

The comparator can also include background questions, which the comparator user responds to. If, based on the given responses, the comparator user's profile corresponds to a predetermined profile, the comparator according to the invention can indicate a need for online chat.

A response combination can advantageously be formed from the actual comparator questions, from which combination the comparator is configured to give the customer servant a hint about what product the customer in question is interested in. If it is question of a car shop, the customer servant could send a message: "It looks like you are interested in sports cars. Are you already familiar with xxx?"

The customer's activity in connection with responding to the comparator question can be used as a threshold value. Hesitation with a response (e.g. moving the evaluation from side to side), can be indicated to the customer servant, who poses a question: "Can I help you decide on the colour?"

The products or services selected onto the comparator user's target list can advantageously function as a threshold value, as a result of which an online chat is offered. This is the case for example if high price class products or products on special offer turn up on the evaluation target list.

Geographical position data deduced from the comparator user's background data or his IP address can advantageously be utilised as a threshold value, as a result of which the customer servant sends for example an online message: "Did you know that they have a presentation of xxx in Joensuu today?"

When the online chat has been started, the words and word combinations used in the online chat give the customer servant specified information about the customer's interest or problem. The comparator advantageously automatically offers suitable responses either as support for online chat for the customer servant and/or directly to the customer.

The comparator user can also himself start an online chat by requesting additional information or service regarding some target being evaluated. The comparator user sends the online chat request with his data processing device to a server, which steers it to the data processing device of the service provider's customer servant.

The comparator can based on the background questions and actual comparator questions select the most suitable customer servant for online chat with said comparator user.

The response history stored in the comparator and the words used in the online chat can be taken into account in a possible price negotiation.

The service provider's customer servant can also steer the comparator user to a shopping basket or to an online store in a corresponding manner to how the salesperson in a normal store lifts two products onto the table and asks which one you will take.

During the online chat the customer servant has a possibility to add some unevaluated product or service to the comparison target, which based on the online chat seems to interest the comparator user.

During the online chat the service provider's customer servant can grab the comparator user's selection controls and suggest altering the evaluation of some comparison target, which would be seen by the comparator user as movement of the control (for example in a different colour) to a new point, and if the customer responds with "ok", the control would move to that point. By proceeding thus also such properties of the targets can be presented to the comparator user, which originally did not belong to the comparator user's selections.

The comparator makes possible for the customer servant a graphic "store view", where the comparator users (e.g. webstore users) are seen as customers in a store, which he serves in turn. The comparator can advantageously suggest who next needs service the most and what it is worth asking first of this comparator user.

The comparator according to the invention can advantageously also utilise automatic translating to the comparator user's language and back based on clues obtained from the background information and the IP address. At first the question may be: "Voinko auttaa? Can I help you?" Whereby based on the response from the comparator user, the language used in the online chat advantageously automatically changes to the correct one.

Figure 5:
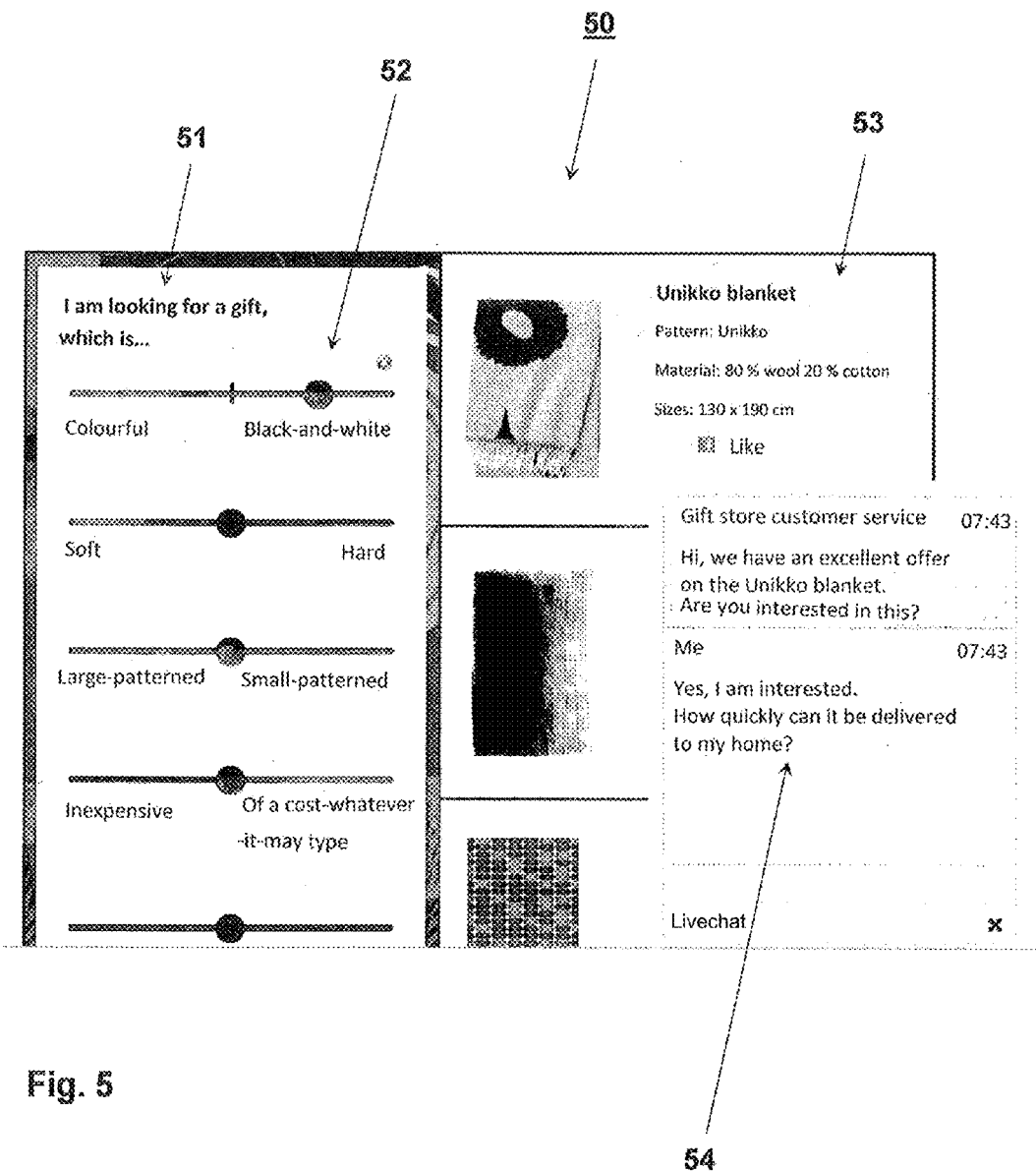
FIG. 5 shows an example of an online chat started by the comparator.

FIG. 5 shows an example of an online chat performed in connection with the comparator. Reference 50 shows an exemplary comparator view on the screen of the comparator user's data processing device.

In the exemplary comparator 50 a gift is searched for or selected with the aid of a few exemplary evaluation targets 51. The example of the figure shows five exemplary statements for evaluating the products, which are seen in the product section 53 of the comparator.

Reference 52 shows the comparator user's first evaluation. He has selected as one product property that the gift can be almost black-and-white. In the example of FIG. 5 the evaluation 52 made by the comparator user has exceeded a threshold value pre-set into the comparator. After the exceeding of the threshold value the comparator has produced an indication to the service provider's customer servant that a certain threshold value has been exceeded. Thus the customer servant has a possibility to offer an online chat possibility to the comparator user.

In the online chat section 54 the "Gift store customer service" has at first sent an online chat message to the comparator user: "Hi, we have an excellent offer on the Unikko blanket. Are you interested?"

To this message the comparator user has responded: "Yes, I am interested. How quickly can it be delivered to my home?"

Thereafter the online chat between the customer servant and the comparator user advantageously continues as long as the comparator user finds it necessary.

Some advantageous embodiments of the comparison method and comparator according to the invention have been described above. The invention is not limited to the solutions described above, but the inventive idea can be applied in numerous ways within the scope of the claims.

The invention claimed is:

1. A method for implementing a property comparison with a comparator, the comparator comprising functions that are provided with a computer program executed in a server, and in which a graphic evaluation frame is used for giving and displaying evaluations, wherein the comparison method comprises:

opening the comparator in the server by a command sent by a comparator user's data processing device;

selecting at least one comparison target from a plurality of comparison targets of the comparator, wherein the comparison targets comprise at least one evaluation property, by a command given by the comparator user's data processing device;

the comparator user giving an evaluation regarding at least one property of the comparison target being evaluated with the comparator user's data processing device by using the graphic evaluation frame;

determining in the comparator an accuracy percentage illustrating the congruency between the evaluation given by the comparator user and one property of the selected comparison target;

saving the determined accuracy percentage in the comparator;

indicating in the comparator that at least one online chat threshold value set for a property of the comparison target has been exceeded;

indicating on a data processing device of a customer servant of a service provider a need of an online chat; and after the online chat;

displaying on the comparator user's data processing device a total accuracy percentage obtainable from the comparator of all properties of at least one comparison target.

2. The method according to claim 1, wherein a predetermined combination of background data given by the comparator user produces an indication that the online chat threshold value has been exceeded.

3. The method according to claim 1, wherein an evaluation given by the comparator user regarding one property being evaluated produces an indication that the online chat threshold value has been exceeded.

4. The method according to claim 1, wherein a combination of evaluations given by the comparator user regarding at least two properties being evaluated produces an indication that the online chat threshold value has been exceeded.

5. The method according to claim 1, wherein evaluation actions of the comparator user in connection with giving at least one evaluation produces an indication that the online chat threshold value has been exceeded.

6. The method according to claim 1, wherein products or services on a comparator user's target list produce an indication that an online chat threshold value has been exceeded.

7. The method according to claim 1, wherein a geographical location of the comparator user, which has been discovered either from the comparator user's Internet Protocol (IP) address or from the comparator user's background information, produces an indication that an online chat threshold value has been exceeded.

8. The method according to claim 1, wherein an accuracy percentage of an evaluation given by the comparator user in the graphic evaluation frame regarding one property is calculated with the equation $$A = \left[1 - \frac{|X_K - X_E|}{N}\right] * 100,$$

in which
A is a congruency of the comparator user's evaluation point and an evaluation point given to a property of the comparison target expressed as an accuracy percentage for one axis of the evaluation frame;
$X_K$ is a value between 0 and N of the comparator user's evaluation point on one axis of the graphic evaluation frame;
$X_E$ is a value between 0 and N determined for the property of the comparison target being evaluated on one axis of the graphic evaluation frame;
N is an integer number, with which the axis/axes of the graphic evaluation frame are divided into equally large parts.

9. The method according to claim 8, wherein the total accuracy percentage of all the properties of one comparison target being evaluated for the comparator user is calculated with the equation $$S = \sum_{j=1}^{n} \frac{A_j}{n},$$

in which
S is a total accuracy percentage of all the properties of one comparison target;
$A_j$ is an accuracy percentage of axis j of the graphic evaluation frame; and
n is a total number of evaluation axes included in all the used graphic evaluation frames.

10. Data network devices arranged for implementing a property comparator, wherein the data network devices include:
at least one comparator user's data processing device for the comparator user to give an evaluation of at least one property of a comparison target being compared with a graphic evaluation frame;
a data transfer network;
a server, which includes the comparator comprising:
means for providing the graphic evaluation frame of the comparator as a World Wide Web (www)-page on comparator users' data processing device;
a database for saving evaluations of the comparison target given with the users' data processing device using the graphic evaluation frame;
means for calculating both a property-specific accuracy percentage and a total accuracy percentage of the comparison target;
means for indicating that at least one online chat threshold value set for a property of the comparison target has been exceeded in the comparator;
means for engaging in online chat in the comparator, if the comparator has indicated that the online chat threshold value has been exceeded;
means for, after engaging in the online chat, displaying the comparison result of the comparator graphically on the screen of the comparator user's data processing device in an order determined by the total accuracy percentage.

11. The data network devices according to claim 10, wherein an exceeding of the threshold value has been configured to be indicated in the comparator with at least one of the following threshold values: a predetermined combination of background data given by the comparator user; an evaluation given by the comparator user regarding one property being evaluated; a combination of evaluations given by the comparator user regarding at least two properties being evaluated; evaluation actions of the comparator user in connection with giving at least one evaluation; products or services on the comparator user's target list; or a geographical location of the comparator user, which has been discovered either from the comparator user's IP address or from the comparator user's background information.

12. The data network devices according to claim 10, wherein the accuracy percentage A of the evaluations given by the comparator user in the graphic evaluation frame regarding one property is configured to be calculated with theequation A=[1-XK-XEN]*100, ##EQU00005## in which A is a congruency of the comparator user's evaluation point and an evaluation point given to a property of the comparison target expressed as an accuracy percentage for one axis of the evaluation frame; X.sub.K is a value between 0 and N of the comparator user's evaluation point on one axis of the graphic evaluation frame; X.sub.E is a value between 0 and N determined for the property of the comparison target being evaluated on one axis of the graphic evaluation frame; N is an integer number, with which the axes of the graphic evaluation frame are divided into equally large parts.

13. The data network devices according to claim 12, wherein the total accuracy percentage of all the properties of one comparison target being evaluated for the comparator user is configured to be calculated with the equation S =j=1n A j n, ##EQU00006## in which S is a total accuracy percentage of all the properties of one comparison target A.sub.j is an accuracy percentage of axis j of the graphic evaluation frame; and n is a total number of evaluation axes included in all the used graphic evaluation frames.

14. The data network devices according to claim 10, wherein the comparator is configured to be implemented as cloud computing in a data network.

15. A computer-readable non-transitory data storage medium comprising a computer program for a property comparator, the computer program including:
computer readable code for opening the comparator in a server by a command sent by a comparator user's data processing device;
computer readable code for selecting at least one comparison target from a plurality of comparison targets of the comparator, wherein the comparison targets comprise at least one evaluation property, by a command given by the comparator user's data processing device;
computer readable code for giving an evaluation regarding at least one property of the comparison target being evaluated with the comparator user's data processing device by using the graphic evaluation frame;
computer readable code for determining in the comparator an accuracy percentage illustrating the congruency between the evaluation given by the comparator user and one property of the selected comparison target;
computer readable code for saving the determined accuracy percentage in the comparator;
computer readable code for indicating in the comparator that at least one an online chat threshold value set for a property of the comparison target has been exceeded;
computer readable code for indicating on a data processing device of a customer servant of a service provider a need of an online chat; and after the online chat;
computer readable code for displaying on the comparator user's data processing device a total accuracy percentage obtainable from the comparator of all properties of at least one comparison target.

16. The computer-readable non-transitory data storage medium according to claim 15, which further comprises computer readable code for calculating the accuracy percentage of the evaluation given by the comparator user in the graphic evaluation frame regarding one property with the equation $$A = \left[1 - \frac{|X_K - X_E|}{N}\right] * 100,$$

in which
A is a congruency of the comparator user's evaluation point and an evaluation point given to the property of the comparison target expressed as an accuracy percentage for one axis of the evaluation frame;
$X_K$ is a value between 0 and N of the comparator user's evaluation point on one axis of the graphic evaluation frame;
$X_E$ is a value between 0 and N determined for the property of the comparison target being evaluated on one axis of the graphic evaluation frame;
N is an integer number, with which the axis/axes of the graphic evaluation frame are divided into equally large parts.

17. The computer-readable non-transitory data storage medium according to claim 15, which further comprises computer readable code for calculating the total accuracy percentage of all the properties of one comparison target being evaluated for the comparator user with the equation $$S = \sum_{j=1}^{n} \frac{A_j}{n},$$

in which
S is a total accuracy percentage of all the properties of one comparison target;
$A_j$ is an accuracy percentage of axis j of the graphic evaluation frame; and
n is a total number of evaluation axes included in all the used graphic evaluation frames.

18. The computer-readable non-transitory data storage medium according to claim 15, which further comprises computer readable code for indicating that the online chat threshold value has been exceeded because of: a predetermined combination of background data given by the comparator user; an evaluation given by the comparator user regarding one property being evaluated; a combination of evaluations given by the comparator user regarding at least two properties being evaluated; evaluation actions of the comparator user in connection with giving at least one evaluation; products or services on the comparator user's target list; or a geographical location of the comparator user, which has been discovered either from the comparator user's Internet Protocol (IP) address or from the comparator user's background information.

* * * * *